(12) United States Patent
Bangalore et al.

(10) Patent No.: US 7,783,473 B2
(45) Date of Patent: Aug. 24, 2010

(54) SEQUENCE CLASSIFICATION FOR MACHINE TRANSLATION

(75) Inventors: Srinivas Bangalore, Morristown, NJ (US); Patrick Haffner, Atlantic Highlands, NJ (US); Stephan Kanthak, Chatham, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 862 days.

(21) Appl. No.: 11/647,080

(22) Filed: Dec. 28, 2006

(65) Prior Publication Data

US 2008/0162111 A1 Jul. 3, 2008

(51) Int. Cl.
  *G06F 17/28* (2006.01)
  *G10L 21/00* (2006.01)

(52) U.S. Cl. .......................................... 704/2; 704/277

(58) Field of Classification Search ....................... None
See application file for complete search history.

(56) References Cited

U.S. PATENT DOCUMENTS 6,885,985 B2 * 4/2005 Hull ............................... 704/2
2003/0065502 A1 * 4/2003 Zhu et al. ....................... 704/4

OTHER PUBLICATIONS

Garcia-Varea et al., "Maximum Entropy Modeling: A Suitable Framework to Learn Context-Dependent Lexicon Models for Statistical Machine Translation", Machine Learning, vol. 60, pp. 135-158, Sep. 2005.*

Ney, "Stochastic Modelling: From Pattern Classification to Language Translation", 15th International Conference on Pattern Recognition, ICPR '00, vol. 3, pp. 3025, 2000.*

Brown et al., "The Mathematics of Statistical Machine Translation: Parameter Estimation", Computational Linguistics, vol. 19, Issue 2, pp. 263-311, 1993.*

Bangalore et al., "Sequence Classification for Machine Translation", ICLSP-2006, Sep. 17-21, 2006.*

F. J. Och and H. Ney, "Discriminative training and maximum entropy models for statistical machine translation," in Proc. Annual Meeting of the Association for Computational Linguistics, Philadelphia, PA, Jul. 2002, pp. 295-302.

* cited by examiner

*Primary Examiner*—Brian L Albertalli
(74) *Attorney, Agent, or Firm*—Ronald D. Slusky (57) ABSTRACT

Classification of sequences, such as the translation of natural language sentences, is carried out using an independence assumption. The independence assumption is an assumption that the probability of a correct translation of a source sentence word into a particular target sentence word is independent of the translation of other words in the sentence. Although this assumption is not a correct one, a high level of word translation accuracy is nonetheless achieved. In particular, discriminative training is used to develop models for each target vocabulary word based on a set of features of the corresponding source word in training sentences, with at least one of those features relating to the context of the source word. Each model comprises a weight vector for the corresponding target vocabulary word. The weights comprising the vectors are associated with respective ones of the features; each weight is a measure of the extent to which the presence of that feature for the source word makes it more probable that the target word in question is the correct one.

9 Claims, 2 Drawing Sheets

SEQUENCE CLASSIFICATION FOR MACHINE TRANSLATION

BACKGROUND

The present invention relates to sequence classification such as required when carrying out machine translation of natural language sentences.

In machine translation, the objective is to translate a source sentence such as the English sentence I need to make a collect call into a target sentence, such as the Japanese version of that sentence 私はコレクトコールを かける 必要があります.

This task is a special case of the more general problem known as sequence classification.

Stated in more general terms, the natural language translation problem can be understood as a specific case of taking a source symbol sequence and classifying it as being a particular target symbol sequence. For convenience, the discussion herein uses the terms "word," "sentence," and "translation" rather than "symbol," "sequence" and "classification," respectively. It is to be understood, however, that the invention is applicable to the more general case of translating one sequence of symbols into another. It will also be appreciated that the invention is applicable not only to grammatically complete sentences but to phrases or other strings of words that amount to something less than a complete grammatical sentence, and thus the word "sentence" in the specification and claims hereof is hereby defined to include such phrases or word strings.

The task of identifying the target sentence word that corresponds to a source sentence word would be somewhat straightforward if each source language word invariably translated into a particular target language word and all in the same order. However, that is often not the case. For example, the English word "collect" in the above sentence refers to a type of telephone call in which the called party will be responsible for the call charges. That particular meaning of the word "collect" translates to a particular word in Japanese. But the word "collect" has several other meanings, as in the phases "collect your papers and go home," and "collect yourself, you're getting too emotionally involved." Each of those meanings of the word "collect" has a different Japanese language counterpart. And word order varies from one language to the next.

The probability that a particular word in the target vocabulary is the correct translation of a word in the source sentence depends not only on the source word itself, but the surrounding contextual information. Thus the appearance of the word "call" directly after the word "collect" in an English sentence enhances the probability that the Japanese word コレク ト is the correct translation of the word "collect" because the use of the two words "collect" and "call" in one English sentence increases the probability that "collect" is being used in the source sentence in the telephone context.

SUMMARY OF THE INVENTION

The above could be taken into account in the machine translation environment via sentence-level training and translation using a discriminative training approach. An encoder would be trained by being given English training sentences as well as the corresponding Japanese sentences, resulting in sentence-level models. A decoder would then use the models for translation. In particular, given a source English sentence, the probability that any given one of the Japanese sentences is the translation of the source English sentence could be computed based on the models that were developed for each Japanese sentence. The Japanese language sentence with the highest computed probability would be selected as the correct translation of the source English sentence. Because the models are sentence-level models based on whole training sentences, the aforementioned contextual information is built into the models.

Such approach may be practical if the size of the target vocabulary and/or number of, or variability among, source sentences is small. However, in the general case of natural language translation—or even in many specialized translation environments—the number of possible sentences is exponentially large, making the computational requirements of training the models prohibitively resource-intensive.

The present invention, which addresses the foregoing, is illustrated herein in the context of a process that translates words in a natural language source sentence into corresponding words in a natural language target sentence. The classification is carried out using an independence assumption. The independence assumption is an assumption that the probability of a correct translation of a source sentence word into a particular target sentence word is independent of the translation of other words in the sentence.

This independence assumption is, in fact, incorrect. That is to say, the probability that a particular target language word is the correct translation of a particular source sentence word can be affected by how other words in a sentence are translated. Thus probabilities of correct translations of the various words are actually interdependent, not independent, per the invention's independence assumption.

As a simple example, consider a source sentence that includes the English words "collect" and "bank." The word "collect" can refer to a "collect" telephone call or can be used in a financial transaction environment in which a financial institution may "collect" funds from another bank, say. There are two different words in Japanese corresponding to those two meanings of "collect." Similarly, the word "bank" can refer to, for example, a financial institution or a river bank. Again, there are two different words in Japanese corresponding to those two meanings. The probability that the correct translation of the word "bank" in a given sentence is the Japanese word referring to the financial institution is enhanced if we knew that the correct translation of the word "collect" in that same sentence is the Japanese word referring to the collection of funds, rather than the telephone environment meaning of "collect."

Although a strong assumption, the independence assumption that informs the present invention allows for a source translation process to be carried out with far fewer computational resources than if the above-described interdependence were to be taken into account as in, for example, a sentence-level translation approach.

In accordance with the invention claimed in our commonly-assigned, co-pending U.S. patent application, Ser. No. 11/646,983 filed of even date herewith and entitled "Discriminative Training Of Models For Sequence Classification," word models are developed for each target vocabulary word based on a set of features of the corresponding source word in training sentences, with at least one of those features relating to the context of, i.e., contextual information about, the source word. Each model illustratively comprises a weight vector for the corresponding target vocabulary word. The weights comprising the weight vectors are associated with respective ones of the features; each weight being a measure of the extent to which the presence of that feature for the source word makes it more probable that the target word in question is the correct one.

Given such word models, then in accordance with the principles of the present invention, each word of the source sentence is classified independently of the other words of the source sentence. The source sentence can then be classified based on the independently classified source words.

Because the above approach translates a word-at-a-time, it does not provide some of the functionality inherent in a sentence-level approach, such as sequencing the symbols in the target sentence in a manner consistent with the grammatical rules of the target language. However, that and other functions needed for a complete translation process can be readily taken care of by other steps that are known or can be derived by those skilled in art, such steps being carried out within the context of an overall process of which the present invention would constitute a part.

The above summarizes the invention using terms relating to natural language translation—terms such as "word," "sentence" and "translation." As noted above, however, the principles of the invention are applicable to the more general case of classifying symbols in a symbol sequence.

DETAILED DESCRIPTION OF ILLUSTRATIVE EMBODIMENTS

Overview Description

Figure 1:
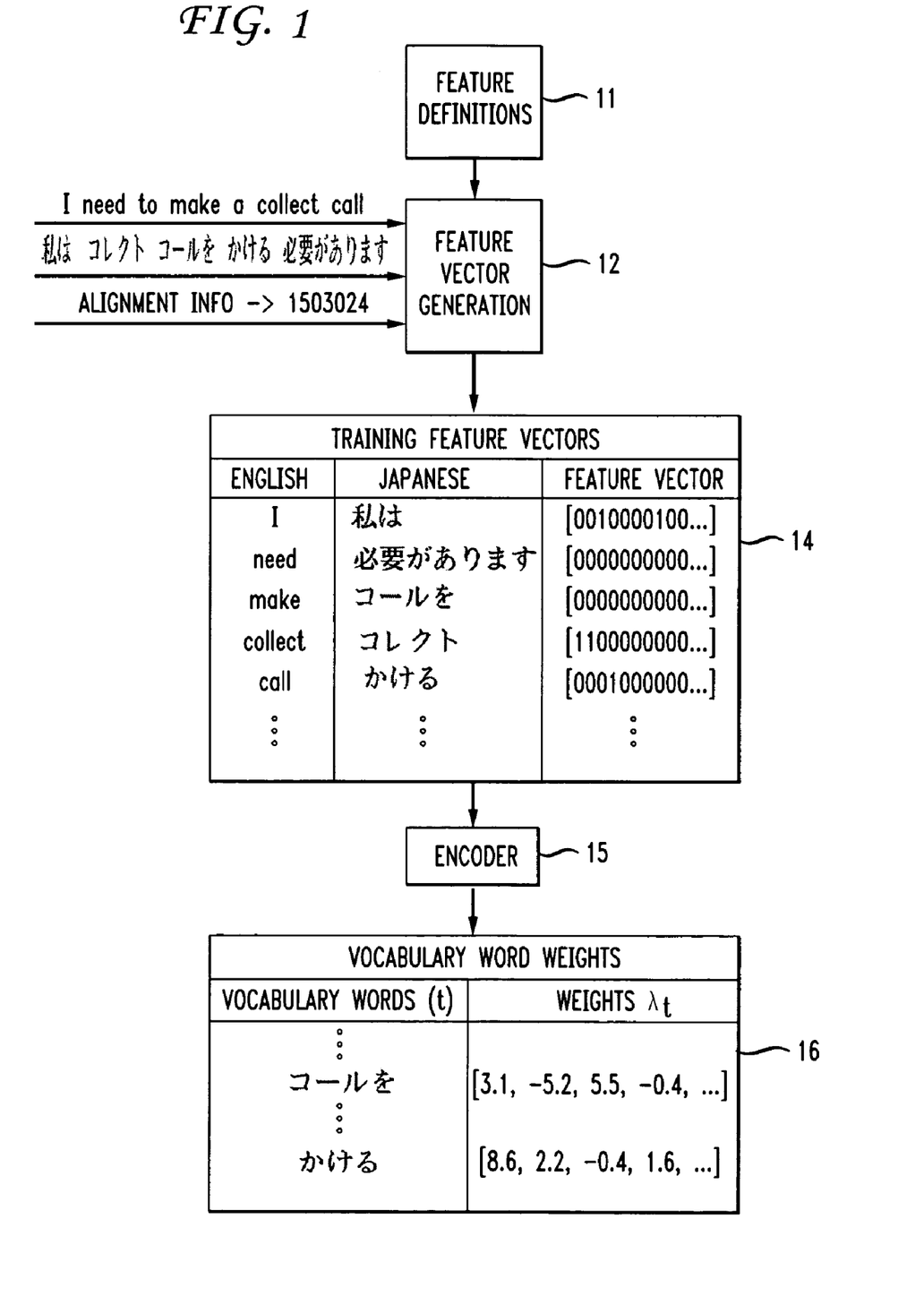
FIG. 1 is a conceptual block diagram of a discriminative training process for developing word models.
Figure 2:
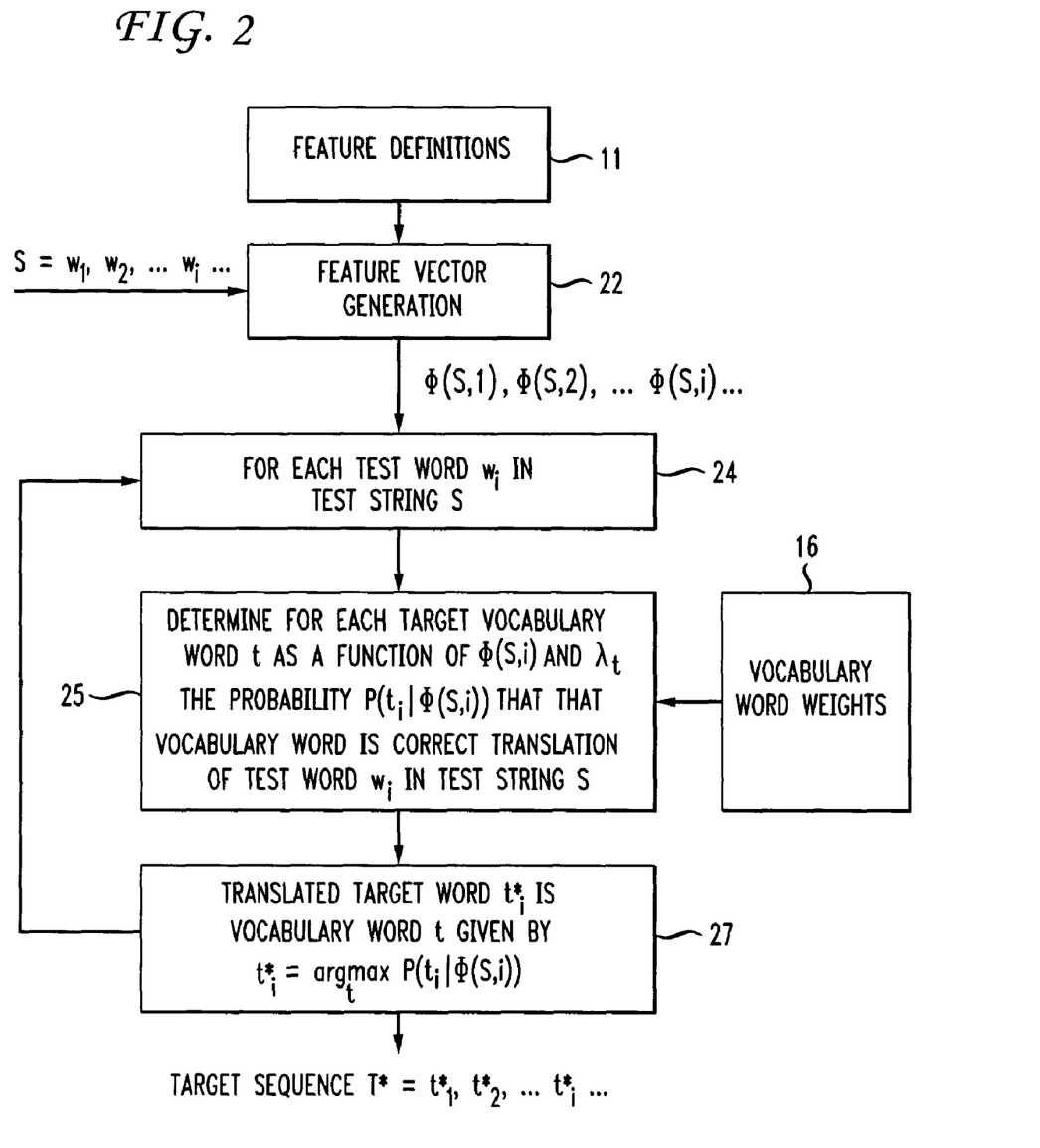
FIG. 2 is a conceptual block diagram of a translation process that uses the word models developed during the training process to translate source sequence words into target sequence words pursuant to the principles of the present invention.

FIGS. 1 and 2 are respective conceptual block diagrams of discriminative training and translating processes.

Illustratively the disclosed processes enable the translation of the words of a word sequence, or sentence, in a source natural language into corresponding words of a target natural language. The source and natural languages are illustratively English and Japanese, respectively.

FIG. 1, more particularly, represents the training phase of the disclosed process in which training sentences in English and the corresponding sentences in Japanese are used in a discriminative training process to develop a set of weights for each of the Japanese words. These weights are then used in the process of FIG. 2 to carry out the aforementioned translation.

The training process depicted in FIG. 1 is repeated for a large number of training sentences. By way of example, the processing of a single training sentence is depicted. Three pieces of information are input for each training sentence. These are the English training sentence—illustratively "I need to make a collect call"—the corresponding Japanese training sentence 私はコレクトコールをかける必要があります and so-called alignment information. The alignment information for this training sentence is illustratively 1 5 0 3 0 2 4. Each digit position in the alignment information corresponds to a word in the English sentence. The value at each digit position indicates the position of the corresponding Japanese word in the given Japanese sentence. Thus 1 5 0 3 0 2 4 means that the words "I" "want" "make" "collect" and call" are the $1^{st}$, $5^{th}$, $3^{rd}$, $2^{nd}$ and $4^{th}$ words in the corresponding Japanese sentence. The 0s in the alignment information indicate that the words "to" and "a" in the English sentence do not have a corresponding word in the Japanese sentence. Those skilled in the art are aware of software tools that can be used to generate such alignment data. One such tool is GIZA++ alignment tool These three pieces of information are processed by feature vector generation 12 to generate a training feature vector for each of the words in the Japanese version of the training sentence. It will be appreciated that although feature vector generation 12 is depicted as a stand-alone or special-purpose processing element, it, like the other elements shown in the FIGS., are illustratively implemented as program code carrying out the functionalities described herein when executed by a processor and/or data structures whose data is used by the executing program code.

Feature vector generation 12 generates a set of training feature values, represented as a training feature vector, for each word in the Japanese version of the training sentence by evaluating the English word against a set of feature definitions 11. At least one, and preferably many, of the feature definitions relates to the context of the English word—that is, defines a relationship between a given word in a given training sentence and one or more of the other words in the training sequence. A set of feature definitions used in the present illustrative embodiment is presented below, of which the first nine are explicitly shown:

Feature Definitions
    Is the next word "call"?
    Are the previous words "make a"?
    Is the current word the first word in the sentence?
    Is the current word the last word in the sentence?
    Is the sentence a question?
    Does the current word end with "ing"?
    Does the current word start with an uppercase letter?
    Does the previous word have a punctuation mark?
    Are the next two words "calls but"?
    etc.

A typical set of feature definitions may have, for example, tens of thousands to tens of millions of context-related features. It is within the level of those skilled in the art to be able to develop an appropriate set of features for the kinds of sentences that are to be translated. In particular, a fixed set of template questions are used to describe the feature functions. These template questions are instantiated by the possible contexts that appear in the training data to result in contextual feature functions. Some examples of template questions are as follows:

a. Is the previous word=X?
b. Is the next word=X?
c. Is the word previous to previous word=X?
d. Is the previous word X and next word Y ?
e. Is the previous word capitalized?
f. Is the next word X and previous word capitalized?

Typically the set of template questions is of the order of 100 templates, which when instantiated to all the vocabulary items of the source language result in a large number of feature functions.

Other features could include grammatical and/or linguistic definitions, such as a) "Is this word a noun/verb/adjective, etc? or b) Is this word a subject/predicate/object? Tools are commercially available that can analyze a sentence and answer these kinds of questions. Moreover, although this kind of information could be regarded as information about a particular word (or symbol), such information (or other information) relating to a word (or symbol) could be thought of as being an actual part of the word (or symbol) itself.

The elements of each training feature vector generated by 12 are binary digits (0s and 1s) each indicating whether the corresponding English word does ("1") or does not ("0") have a certain feature. Thus with the feature definitions specified above, the training feature vector for the word "collect" in the sentence "I need to make a collect call" would be [1 1 0 0 0 0 0 0 0 . . . ] because the next word after "collect" is "call"; the words previous to "collect" are "make a"; the current word, "collect," is not the first word in the sentence; and so forth.

Although not shown above or in the drawing, the feature definitions also include an indication of what the English word in question actually is. In the simplest case, this could be done by allocating a position in the feature vector for each English word expected to appear in the training sentences and in sentences that will later be presented for translation. The binary value would be "0" at each of those positions of the vector except at the position corresponding to the word itself, where the value would be "1". In practice, there are more compact ways of encoding the identity of the English word within the training feature vector, as those skilled in the art are aware.

FIG. 1 indicates at 14 that a training feature vector is generated for each word appearing in the Japanese version of the training sentence. As indicated by ellipses in 14, many more training sentences would be processed in the manner just described.

After an appropriate number of training sentences has been processed and the training feature vectors have been generated, the training feature vectors are processed by an encoder 15, which also receives an indication of the Japanese word corresponding to each training feature vector. The training sentences are designed such that each English word that one expects will be presented for translation in the translation phase appears a sufficient number of times in the training sentences to achieve accurate weight values as is about to be described.

Encoder 15 develops a symbol, i.e., word, model in the form of a set of weights for each Japanese word appearing in the training sentences, as represented by weights table 16. The list of the Japanese words that appeared in the training sentences is referred to as the target vocabulary. An individual word in the target vocabulary is denoted by "t", which is in the nature of a variable that ranges over the list of vocabulary words. Thus the "values" that "t" can take on are the various Japanese words in the target vocabulary. (In a slight variation of this notation, "t" is used in Equation 9 appearing hereinafter as a summation index ranging from 1 to V, where V is a number indicating the number of words in the vocabulary. Each numeral from 1 to V is, in that case, a stand-in label for a respective Japanese word.)

Each word t of the target vocabulary has an associated set of weights represented by a weight vector $\lambda_t$. Each of the weights in weight vector $\lambda_t$ is a numerical value associated with the corresponding feature definition. Thus, for example, the first entry in the weight vector for the word コールを,which is the number 3.1, is a weight associated with the first feature definition "is the next word 'call'". The weight vectors are used in the course of translating the words of a source English sentence as described below. For the present it suffices to note that each weight in the weight vector for a particular target vocabulary word t is a measure of the probability that a word in a source sentence to be translated translates to that particular target vocabulary word t, when the source sentence word has the feature in question. Thus in this example the weight 3.1 is a measure of the probability that an English word in a source sentence to be translated corresponds to the Japanese word コールを when the English word meets the feature definition "is the next word 'call.'"

A technique for encoding the training feature vectors to derive the weight vectors is described in the Dudik et al reference [19] cited hereinbelow. In a practical embodiment, the weights can take on any positive or negative value and may have four decimal places of precision. To keep the drawings and examples simple, all weights shown in FIG. 1 have only one decimal place of precision and are all within the range −10.0 to +10.0.

Once the weight vectors have been developed, translation of the words of a source English sentence can be carried out. FIG. 2 shows such a source sentence S comprising the words $w_1, w_2, \ldots w_i \ldots$. The source sentence S is applied to feature vector generation 22 that, just like feature vector generation 12 of FIG. 1, generates a feature vector for each word of the sentence by evaluating each word against the set of feature definitions 11. The feature vectors generated for words $w_1, w_2, \ldots w_i \ldots$ of the sentence S are denoted $\Phi(S,1), \Phi(S,2), \ldots \Phi(S,i), \ldots$, respectively. For each of the words $w_1, w_2, \ldots w_i \ldots$ a determination is made as to what the most likely correct corresponding Japanese word is. That process is represented by boxes 24 and 25 in FIG. 2, with the latter using the weight vectors from table 16 of FIG. 1.

The translation of each word is carried out independent of what was determined to be the correct translation of any other word in the source sentence. In particular, given the $i^{th}$ word $w_i$, a determination is made for each target vocabulary word t. That determination is a determination of the probability that the target vocabulary word is the correct translation of word $w_i$. As shown at 25, the probability that vocabulary word t is the correct translation of $w_i$ is denoted $P(t_i|\Phi(S,i))$. As also shown at 25, that probability is a function of the feature vector for $w_i$ and the weights associated with the word t, i.e., $\lambda_t$. The specific computation is shown hereinbelow as Equation 9. Suffice it to note for the present discussion that the probability $P(t_i|\Phi(S,i))$ is a function of the dot product $\lambda_t \cdot \Phi(S,i)$. It will be recalled that the dot product of two vectors is the sum of the products of corresponding elements in the two vectors. For example the dot product of the two vectors [1 0 1] and [1.2 3.4 0.1] is (1×1.2)+(0×3.4)+(1×0.1)=1.3.

Heuristically one can understand why the probability that target vocabulary word t is the correct Japanese word is a function of the dot product $\lambda_t \cdot \Phi(S,i)$. Recall that as noted above, the weight in $\lambda_t$ associated with each feature is a measure of the probability that word t is the correct translation of the source word to be translated when the source word has that feature. Thus a) the more of the features that the source word has that b) have relatively large associated weights, the larger will be the dot product, reflecting an increased likelihood that the Japanese word being considered is the correct translation.

Because the feature vector is comprised of 0s and 1s, it may be observed that the dot product is given by the sum of the weights associated with feature definitions that are met by the source word in question. Thus the probability that word t is the correct translation of the source word is a function of the sum of the weights associated with feature definitions that are met by the source word in question.

After the dot products for all values of t—that is, for each word in the target vocabulary—have been determined, the vocabulary word associated with the largest dot product, denoted t*, is taken to be the correct translated target word.

As indicated at 27, the translated target word, denoted t*. is the vocabulary word t given by $$t_i^* = \underset{t}{\operatorname{argmax}} P(t_i \mid \Phi(S, i))$$

meaning that, given word $w_i$, the translated target word $t^*_i$ is the one having the largest, or maximum (argmax), associated probability.

It was noted above that feature definitions 11 include as a feature, in addition to contextual features such as those shown above, an indication of what the English word itself actually was. The weight associated with the English word will be very high for all possible translations of that English word into Japanese. That is, the weight associated with the source word being "collect" will be very high for each of the several Japanese words that "collect" might be correctly translated into. As a result, those several Japanese words will inevitably be the ones with the largest dot products whenever the word being processed is the English word "collect". The context-related components of the dot product will then "tip the scales" toward whichever of those several Japanese words that mean "collect" is the correct one.

Finally, FIG. 2 indicates that the output of the process is the target sentence $T^*=t^*_1, t^*_2 \ldots t^*_i \ldots$.

Theoretical Underpinnings

The following presents the theoretical underpinnings of the invention. The scientific papers referenced herein with numeric identifiers, e.g. [1], are listed below.

1. Introduction

Discriminatively trained classification-based techniques have become the dominant approach for resolving ambiguity in speech and natural language processing problems. Although these techniques originated for document routing tasks which use features from the entire document, they have also been successfully applied to word-level disambiguation tasks such as part-of-speech tagging, named-entity tagging, and dependency parsing tasks which rely on features in the local context of a word. Models trained using these approaches have been shown to out-perform generative models as they directly optimize the conditional distribution without modeling the distribution of the independent variables.

However, most of machine translation research has focused on generative modeling techniques. Discriminative training has been used only for model combination [1] but not directly to train the parameters of a model. Applying discriminatively trained classification techniques directly to estimate the parameters of a translation model requires scaling the classifiers to deal with very large label sets, typically the size of the target language vocabulary. We here present a method for scaling the classifiers to such large label sets and apply it to train machine translation models for spoken language translation tasks.

There have been several attempts at exploiting syntactic information in a generative modeling framework to improve the accuracy of machine translation [2]. However, these approaches have met with only marginal success at best. We believe that the discriminative classification framework is more suitable for exploiting such linguistically rich information as they do not model the distribution of independent variables and hence are not affected by sparseness issues that typically affect generative models.

2. Statistical Machine Translation Model

In machine translation, the objective is to map a source symbol sequence $S=s_1, \ldots, s_N$ ($s_i \in L_S$) into a target sequence $T=t_1, \ldots, t_M$ ($t_i \in L_T$). This can be formulated as a search for the best target sequence that maximizes P(T|S). Ideally, P(T|S) should be estimated directly to maximize the conditional likelihood on the training data (discriminant model). However, T corresponds to a sequence with an exponentially large combination of possible labels, and traditional classification approaches cannot be used directly. To overcome this problem, Bayes transformation is applied and generative techniques are adopted as suggested in the noisy channel paradigm [3]. The sequence S is thought of as a noisy version of T and the best guess T* is then computed as $$T^* = \underset{T}{\operatorname{argmax}} P(T \mid S) \qquad (1)$$
$$= \underset{T}{\operatorname{argmax}} P(S \mid T) P(T) \qquad (2)$$

The translation probability P(S|T) is estimated from a corpus of alignments between the tokens of S and tokens of T. Although there have been several approaches to alignment—string-based and tree-based alignment—for the purposes of this paper, we use Giza++ [4] to provide an alignment between tokens of the source language and tokens of the target language. Using the same source of alignments, there have been several variations on decoders to compute the best T* given an input source string S. We discuss some of these decoders in the next section.

3. Decoders for Machine Translation

Equations 1 and 2 can be interpreted in different ways which results in different decoder architectures. We outline below these decoder architectures.

3.1 Conditional Probability Model Based Decoders

Using conditional probability models as in Equation 2 has the advantage of composing the translation process from multiple knowledge sources that could be trained independently. Kumar and Byrne [5] have shown that the translation process can be further decomposed into five models, namely source language model, source segmentation model, phrase permutation model, template sequence model and phrasal translation model. As all models are trained independently, different data sets may be used for the estimation of each. Other examples for decoders based on conditional probabilities can be found in [3, 4, 6, 7, 8].

3.2 Joint Probability Model Based Decoders

The FST-based decoders as illustrated in [9, 10, 11, 12], decode the target string using a joint probability model P(S,T) from the bilanguage corpus. The bilanguage could be in either source word-order or target word-order. This gives rise to two different two-stage decoders. As shown in Equation 3, first the source string is mapped to a target string in the source word-order. The target string is computed as the most likely string based on the target language model from a set of possible reorderings of $\hat{T}$ (Equation 4).

$$\hat{T} = \underset{T}{\operatorname{argmax}} P(S, T) \qquad (3)$$
$$\hat{T}^* = \underset{T \in \lambda_{\hat{T}}}{\operatorname{argmax}} P_{\lambda_{\hat{T}}}(\hat{T}) \qquad (4)$$

In a different version of the decoder, a set of possible reorderings ($\lambda_S$) of the source string is decoded, instead of reordering the decoded target string, as shown in Equation 5.

$$T^* = \underset{T}{\arg\max} \sum_{\hat{S} \in \lambda_S} P(\hat{S}, T)$$

3.3 Sentence-Based Feature Combination

Relaxing the conditional probability approach to also allow for unnormalized models leads to a sentence-based, exponential feature combination approach (also called log-linear model combination):

$$T^* = \underset{T}{\arg\max} \sum_i \lambda_i \cdot h_i(S, T) \tag{6}$$

The choice of features is virtually unlimited, but using the approach to tune just the exponents of the conditional probability models in use proves to be quite effective (see also [13, 7, 8]). Crego et al, [12] presents a similar system based on joint probabilities.

4. Finite-State Transducer Based Machine Translation Model

In this section, we explain the steps to build a finite-state machine translation model. We start with the bilingual alignment constructed using GIZA++, as shown here:

---
English: I need to make a collect call
Japanese: 私は コレクト コールを かける 必要があります
Alignment: 1 5 0 3 0 2 4

---

The Alignment string provides the position index of a word in the target string for each word in the source string. Source words that are not mapped to any word have an index 0 associated to them. It is straightforward to compile a bilanguage corpus consisting of source-target symbol pair sequences T= ... ($w_i$:$x_i$) ..., where the source word $w_i \in L_S \cup$ [epsilon] and its aligned word $x_i \in L_T \cup$ [epsilon] ([epsilon] is the null symbol). Note that the tokens of a bilanguage could be either ordered according to the word order of the source language or ordered according to the word order of the target language. We see here ---
I: 私は need: 必要があります to:ε make: コールを
a:ε collect_ コレクト call_かける

--- an example alignment and the source-word-ordered bilanguage strings corresponding to the alignment previously shown. From the corpus T, we train a n-gram language model using language modeling tools [14, 15]. The resulting language model is represented as a weighted finite-state automaton (S×T→[0,1]). The symbols on the arcs of this automaton ($s_i$_$t_i$) are interpreted as having the source and target symbols ($s_i$:$t_i$), making it into a weighted finite-state transducer (S→T×[0,1]) that provides a weighted string-to-string transduction from S into T (as shown in Equation 7).

$$T^* = \arg\max_T P(s_i, t_i | s_{i-1}, t_{i-1} \ldots s_{i-n-1}, t_{i-n-1}) \tag{7}$$

5. Sequence Classification Techniques

As discussed earlier, Equation 1 represents a direct method for transducing the source language string into the target language string. It depends on estimates of P(T|S). Learning would consist in modifying the parameters of the system so that T* closely matches the target output sequence $\tilde{T}$. Ideally, P(T|S) should be estimated directly to maximize the conditional likelihood on the training data (discriminant model). However, T corresponds to a sequence output with an exponentially large combination of possible labels, and traditional classification approaches cannot be used directly. Although, Conditional Random Fields (CRF) [16] train an exponential model at the sequence level, in translation tasks such as ours the computational requirements of training such models is prohibitively expensive.

We approximate the string level global classification problem, using independence assumptions, to a product of local classification problems as shown in Equation 8.

$$P(T|S) = \prod_i^N P(t_i | \Phi(S, i)) \tag{8}$$

where $\Phi(S,i)$ is a set of features extracted from the source string S (shortened as $\Phi$ in the rest of the section).

A very general technique to obtain the conditional distribution $P(t_i|\Phi(S,i))$ is to choose the least informative one (with Maxent) that properly estimates the average of each feature over the training data [17]. This gives us the Gibbs distribution parameterized with the weights $\lambda_t$ where t ranges over the label set and V is the total number of target language vocabulary.

$$P(t_i | \Phi) = \frac{e^{\lambda_{t_i} \cdot \Phi}}{\sum_{t=1}^V e^{\lambda_t \cdot \Phi}} \tag{9}$$

The weights are chosen so as to maximize the conditional likelihood $$L = \sum_i L(s_i, t_i)$$

with $$L(S, T) = \sum_i \log P(t_i | \Phi) = \sum_i \log \frac{e^{\lambda_{t_i} \cdot \Phi}}{\sum_{t=1}^V e^{\lambda_t \cdot \Phi}} \tag{10}$$

The procedures used to find the global maximum of this concave function include two major families of methods: Iterative Scaling (IS) and gradient descent procedures, in particular L-BFGS methods [18], which have been reported to be the fastest. We obtained faster convergence with a new Sequential L1-Regularized Maxent algorithm (SL1-Max) [19], compared to L-BFGS (See http://homepages.inf.ed.ac.uk/s0450736/maxent_toolkit.html). We have adapted SL1-Max to conditional distributions for our purposes. Another advantage of the SL1-Max algorithm is that it provides L1-regularization as well as efficient heuristics to estimate the regularization meta-parameters. The computational requirements are O(V) and as all the classes need to be trained simultaneously, memory requirements are also O(V). Given that the actual number of non-zero weights is much lower than the total number of features, we use a sparse feature representation which results in a feasible runtime system.

5.1 Frame Level Discriminant Model: Binary Maxent

For the machine translation tasks, even allocating O(V) memory during training exceeds the memory capacity of current computers. To make learning more manageable, we factorize the frame-level multi-class classification problem into binary classification sub-problems. This also allows for parallelization during training the parameters. We use here V one-vs.-other binary classifiers at each frame. Each output label t is projected into a bit string, with components $b_j(t)$. The probability of each component is estimated independently:

$$P(b_j(t)|\Phi) = 1 - P(\overline{b}_j(t)|\Phi) = \frac{1}{1 + e^{-(\lambda_j - \lambda_{\overline{j}})\Phi}} \quad (11)$$

where $\lambda_{\overline{j}}$ is the parameter vector for $\overline{b}_j(y)$. Assuming the bit vector components to be independent, we have $$P(t_i|\Phi) = \prod_j P(b_j(t_i)|\Phi).$$

Therefore, we can decouple the likelihood and train the classifiers independently. We here use the simplest and most commonly studied code, consisting of V one-vs.-others binary components. The independence assumption states that the output labels or classes are independent.

5.2 Maximum Entropy Markov Models or MEMMs

The independence assumption in Equation 8 is very strong, and one can add more context, replacing $P(t_i|\Phi(S,i))$ with $P(t_i|t_{i-1},\Phi(S,i))$ (bigram independence). While MEMMs [20] allow the use of frame-level Maxent classifiers that learn sequence dependencies, they usually multiply by a factor V the actual number of input features (factor which propagates down to both memory and training time requirements). Also, MEMMs estimate $P(t_i|t_{i-1},\Phi(S,i))$ by splitting into |V| separate models $P_{t_{i-1}}(t_i|\Phi(S,i))$. This causes a new problem known as labeling bias [21]: important frame-level discriminant decisions can be ignored at the sequence level, resulting in a loss of performance [22].

5.3 Dynamic Context Maximum Entropy Model

We believe that the label bias problem arises due to the manner in which $P(t_i|t_{i-1},\Phi(S,i))$ is estimated. The estimation of $P_{t_{i-1}}(t_i|\Phi(S,i))$ requires splitting the corpus based on the $t_{i-1}$ label. This leads to incompatible event spaces across the label set during estimation. In order to alleviate this problem, we use the dynamic context as part of the feature function and compute $P(t_i|\Phi(S,i,t_{i-1}))$. We call this the dynamic context model since the features are to be computed dynamically during decoding, in contrast to the static context model presented above where the features can all be computed statically from the input string.

6. Experiments and Results

We evaluate the translation models on two different spoken language corpora. First, the "How May I Help You" (HMIHY) corpus consists of operator-customer conversations related to telephone services. We use the transcriptions of the customer's utterance which were also manually translated into Japanese and Spanish. The corpus statistics for English-Japanese sentence pairs are given in Table 1. 5812 English-Spanish sentence pairs were used for training, and 829 for testing.

TABLE 1

Corpus Statistics for the HMIHY Corpus

|  |  | English | Japanese |
|---|---|---|---|
| Train | Sentences |  | 12226 |
|  | Words | 83262 | 68202 |
|  | Vocab | 2189 | 4541 |
| Test | Sentences |  | 3253 |
|  | Words | 20533 | 17520 |
|  | Vocab | 829 | 1580 |

The second corpus, ATIS, consists of inquiries to airline reservations services which have been manually transcribed and translated into Spanish. The corpus statistics are given in Table 2.

TABLE 2

Corpus Statistics for the ATIS Corpus

|  |  | English | Spanish |
|---|---|---|---|
| Train | Sentences |  | 11294 |
|  | Words | 116151 | 126582 |
|  | Vocab | 1310 | 1556 |
| Test | Sentences |  | 2369 |
|  | Words | 23469 | 25538 |
|  | Vocab | 738 | 841 |

The accuracy of the translation models are evaluated using the word accuracy metric. Simple accuracy is computed based on the number of insertion (I), deletion (D) and substitutions (S) errors between the target language strings in the test corpus and the strings produced by the translation model.

$$WordAccuracy = \left(1 - \frac{I+D+S}{R}\right) * 100 \quad (12)$$

The word accuracy results of the translation models on the different corpora are shown in Table 3. We show the baseline model of selecting the most frequent target word for a given source word. As can be seen from the table, the FST-based model outperforms the baseline significantly, but the sequence classification based decoder trained using Maxent training performs better than the FST based decoder on all three corpora.

TABLE 3

| Domain | Baseline | FST | Maxent (static) | SVM linear | SVM poly2 |
|---|---|---|---|---|---|
| HMIHY Eng-Jap | 59.5 | 68.6 | 70.6 | 69.1 | 69.7 |
| HMIHY Eng-Spanish | 58.6 | 70.4 | 71.2 | 70.2 | 70.6 |
| ATIS Eng-Spanish | 54.5 | 76.5 | 78.0 | 78.6 | 79.1 |

The classification approach regards the target words, phrases (multi-tokens) and null symbol (epsilon) as labels.

For instance, the ATIS training data contains 336 epsilon labels, 503 phrase labels and 2576 word labels. Using contextual Maxent rather than static Maxent significantly improves the label classification accuracy (from 65% to 67%).

However, in order to evaluate the word accuracy of the translated string, the classified labels are re-transcribed as words by removing epsilon label and expanding out multi-token labels. We observed no significant difference in word accuracy between the translations provided by static context and dynamic context Maxent models after these transformations.

We conjecture that the loss function we use for the classifier does not properly represent the final objective function. Misclassification between two phrase labels has a variable cost, depending on the number of words which differ from one phrase to the other, and this is not accounted for in our loss function. (To factor out the impact of the dynamic programming, we ran the dynamic context Maxent using the true test label as context (cheating decoding). Even in this case, after labels are transcribed into words, the dynamic context Maxent model performance is not better than the static context Maxent model performance.)

Another way to improve performance is to increase the representation power of the static classifier. We first ran linear SVMs which are the same linear classifiers as Maxent with a different training procedure. The lower word accuracy observed with linear SVMs in Table 3 is explained by an over-detection of words against the epsilon model. The recognized class is obtained by comparing one-versus-other models, and their threshold value requires to be more carefully adjusted, for instance using an additional univariate logistic regression [23]. The fact that we observe an improvement from linear to second degree polynomial SVMs shows that the use of kernels can improve performance.

REFERENCED SCIENTIFIC PAPERS

[1] F. Och and H. Ney, "Discriminative training and maximum entropy models for statistical machine translation," in *Proceedings of ACL*, 2002.

[2] K. Yamada and K. Knight, "A syntax-based statistical translation model," in *Proceedings of 39th ACL*, 2001.

[3] P. Brown, S. D. Pietra, V. D. Pietra, and R. Mercer, "The Mathematics of Machine Translation: Parameter Estimation," *Computational Linguistics*, vol. 16, no. 2, pp. 263-312, 1993.

[4] F. J. Och and H. Ney, "A systematic comparison of various statistical alignment models," *Computational Linguistics*, vol. 29, no. 1, pp. 19-51, 2003.

[5] S. Kumar and W. Byrne, "A weighted finite state transducer implementation of the alignment template model for statistical machine translation," in *Proceedings of HLT-NAACL* 2003, Edmonton, Canada, May 2003.

[6] P. Koehn, F. J. Och, and D. Marcu, "Statistical phrase-based translation," in *Proceedings of the Human Language Technology Conference* 2003 (*HLT-NAACL* 2003), Edmonton, Canada, May 2003.

[7] N. Bertoldi, R. Cattoni, M. Cettolo, and M. Federico, "The ITC-IRST Statistical Machine Translation System for IWSLT-2004," in *Proceedings of the International Workshop on Spoken Language Translation* (*IWSLT*), Kyoto, Japan, September 2004, pp. 51-58.

[8] R. Zens, O. Bender, S. Hasan, S. Khadivi, E. Matusov, J. Xu, Y. Zhang, and H. Ney, "The RWTH Phrase-based Statistical Machine Translation System.," in *Proceedings of the International Workshop on Spoken Language Translation* (*IWSLT*), Pittsburgh, Pa., October 2005, pp. 155-162.

[9] S. Bangalore and G. Riccardi, "Stochastic finite-state models for spoken language machine translation," *Machine Translation*, vol. 17, no. 3, 2002.

[10] F. Casacuberta and E. Vidal, "Machine translation with inferred stochastic finite-state transducers," *Computational Linguistics*, vol. 30(2):205-225, 2004.

[11] S. Kanthak and H. Ney, "Fsa: An efficient and flexible c++ toolkit for finite state automata using on-demand computation," in *Proceedings of the 42nd Annual Meeting of the Association for Computational Linguistics*, Barcelona, Spain, 2004, pp. 510-517.

[12] J. M. Crego, J. B. Marino, and A. de Gispert, "An ngram-based statistical machine translation decoder," in *Proc. of the 9th European Conf. on Speech Communication and Technology* (*Interspeech '05*), Lisbon, Portugal, September 2005, pp. 3185-3188.

[13] F. J. Och and H. Ney, "Discriminative training and maximum entropy models for statistical machine translation," in *Proc. Annual Meeting of the Association for Computational Linguistics*, Philadelphia, Pa., July 2002, pp. 295-302.

[14] V. Goffin, C. Allauzen, E. Bocchieri, D. Hakkani-Tur, A. Ljolje, S. Parthasarathy, M. Rahim, G. Riccardi, and M. Saraclar, "The AT&T WATSON Speech Recognizer," in *Proceedings of ICASSP*, Philadelphia, Pa., 2005.

[15] A. Stolcke, "SRILM—An Extensible Language Modeling Toolkit," in *Proc. Intl. Conf. Spoken Language Processing*, 2002.

[16] J. Lafferty, A. McCallum, and F. Pereira, "Conditional random fields: Probabilistic models for segmenting and labeling sequence data," in *Proceedings of ICML*, San Francisco, Calif., 2001.

[17] A. L. Berger, Stephen A. D. Pietra, D. Pietra, and J. Vincent, "A Maximum Entropy Approach to Natural Language Processing," *Computational Linguistics*, vol. 22, no. 1, pp. 39-71, 1996.

[18] R. Malouf, "A comparison of algorithms for maximum entropy parameter estimation," in *Proceedings of CoNLL-2002*. 2002, pp. 49-55, Taipei, Taiwan.

[19] M. Dudik, S. Phillips, and R. E. Schapire, "Performance Guarantees for Regularized Maximum Entropy Density Estimation," in *Proceedings of COLT '04*, Banff, Canada, 2004, Springer Verlag.

[20] A. McCallum, D. Freitag, and F. Pereira, "Maximum entropy Markov models for information extraction and segmentation," in *Proc. 17th International Conf. on Machine Learning.* 2000, pp. 591-598, Morgan Kaufmann, San Francisco, Calif.

[21] L. Bottou, *Une Approche théorique de l'Apprentissage Connexionniste: Applications á la Reconnaissance de la Parole*, Ph.D. thesis, Université de Paris XI, 91405 Orsay cedex, France, 1991.

[22] J. Lafferty, A. McCallum, and F. Pereira, "Conditional random fields: Probabilistic models for segmenting and labeling sequence data," in *Proc. 18th International Conf. on Machine Learning.* 2001, pp. 282-289, Morgan Kaufmann, San Francisco, Calif.

[23] J. Platt, "Probabilistic outputs for support vector machines and comparison to regularized likelihood methods," in *NIPS*. 1999, MIT Press.

CONCLUSION

The embodiments shown and/or described herein are merely illustrative. Those skilled in the art will be able to devise numerous alternative arrangements and processes that while not explicitly shown or described herein embody the principles of the invention and are thus within its spirit and scope.

The invention claimed is:

1. A machine translation method of classifying source symbol sequences into target symbol sequences, the method comprising
    classifying, by the machine, each symbol of the source sequence independently of the other symbols of the source sequence, the classifying being based on symbol models, each of at least ones of the symbol models being a function of training sequence context information, and
    classifying, by the machine, the target symbol sequence based on the independently classified source sequence symbols.

2. The method of claim 1 wherein each symbol model is associated with a respective symbol of a target vocabulary and was generated as a function of contextual information about symbols in a plurality of training sequences.

3. The method of claim 2 wherein each symbol model is a respective set of weights each associated with respective ones of a plurality of feature definitions, at least one of the feature definitions defining a relationship between a given symbol in a given source sequence and one or more of the other symbols in the source sequence.

4. The method of claim 3 wherein said classifying each symbol of the source sequence independently of the other symbols of the source sequence comprises generating for at least ones of the target vocabulary symbols a respective probability, said probability for a given target vocabulary symbol being a function of the associated symbol model's weights and being a further function of which of the feature definitions are met by the source symbol being classified.

5. A machine translation method of translating words in a source natural language sentence into corresponding words in a target natural language sentence, the method comprising
    for a particular source sentence word, determining, by the machine, a probability for each one of a plurality of target vocabulary words, the probability being the probability that said each one target vocabulary word is the correct translation of said particular source sentence word, said probability being a function of a set of feature values and being a further function of a set of weights associated with said each one target vocabulary word, the feature values indicating which of a plurality of feature definitions are met by said particular source sentence word, at least one of the features being contextual information about said particular source sentence word, the weights each being associated with a respective one of the features, and
    selecting, by the machine, a particular one of the target vocabulary words as being the correct translation of the source sentence as a function of the probabilities thus determined.

6. The method of claim 5 wherein the selected target vocabulary word is the target vocabulary word having the highest of said probabilities.

7. The method of claim 5 wherein each of said weights is a measure of the probability that a word in the source sentence translates to said each one of said target vocabulary words when the source sentence word has the feature in question.

8. The method of claim 5 wherein said probability is a function of the sum of the weights associated with feature definitions that are met by said particular source sentence word.

9. The method of claim 5 wherein the weights associated with said each one of said target vocabulary words are the result of discriminative training based on a) training sentences in the source language, b) the corresponding sentences in the target language, and c) alignment information indicating which words in each source language training sentence correspond to which words in the corresponding target language sentence.

* * * * *